United States Patent [19]

Valentine et al.

[11] Patent Number: 4,507,045

[45] Date of Patent: Mar. 26, 1985

[54] ROBOTIC MANIPULATOR INCLUDING ACTUATING UNIT

[75] Inventors: Al L. Valentine, Southfield; Bernard Rinke, Troy; Chester M. Wenzel, Royal Oak, all of Mich.

[73] Assignee: State Die & Engineering, Inc., Roseville, Mich.

[21] Appl. No.: 374,831

[22] Filed: May 5, 1982

[51] Int. Cl.³ .............................................. B25J 15/00
[52] U.S. Cl. .................................... 414/753; 414/718; 294/88; 92/165 PR
[58] Field of Search ............... 414/749, 751, 753, 718, 414/918; 294/88; 92/110, 165 PR, 165 R

[56] References Cited

U.S. PATENT DOCUMENTS

| | | | |
|---|---|---|---|
| 3,488,692 | 1/1970 | Oda et al. | 414/753 X |
| 3,522,838 | 8/1970 | Ott | 414/753 X |
| 3,734,303 | 5/1973 | Blatt | 414/753 |
| 3,773,189 | 11/1973 | Kitamura et al. | 414/753 |
| 3,921,820 | 11/1975 | Crockett | 414/753 |
| 3,935,950 | 2/1976 | Burch | 414/753 X |
| 4,252,361 | 2/1981 | Descoteaux et al. | 414/753 X |

Primary Examiner—Leslie J. Paperner
Assistant Examiner—Terrance L. Siemens
Attorney, Agent, or Firm—Krass & Young

[57] ABSTRACT

A pair of actuatable gripping jaws are secured to a mounting head which is slidably mounted on a support by a pair of guides. The mounting head is of unitary construction and includes a fluid operated motor integral therewith for actuating the jaws at any point along the stroke of the mounting head. One of the guides is defined by the drive shaft of a fluid operated piston and cylinder which reciprocably drives the mounting head. A rigid fluid conduit coupled with the mounting head for supplying fluid to the motor defines the other guide.

1 Claim, 6 Drawing Figures

ROBOTIC MANIPULATOR INCLUDING ACTUATING UNIT

DESCRIPTION

1. Technical Field

The present invention broadly relates to robotics apparatus for manipulating workpieces, particularly of the type having a pair of actuatable gripping jaws, and deals more particularly with a unit for controlling and actuating the jaws.

2. Background Art

Mechanisms for repetitively gripping and manipulating workpieces are commonly employed in the field of robotics. Because of the trend toward increased use of robot devices, there is a need for gripping and actuating mechanisms that possess a high degree of flexibility.

U.S. Pat. No. 4,252,361 to Descoteaux et al is representative of one type of prior art device in which a pair of gripping jaws are operated by an actuating unit. The actuating unit includes a mounting head slidably carried on a support. The jaws are actuated by a spring mechanism carried within the mounting head which is progressively loaded during a stroke of the mounting head toward the workpiece to be gripped. One disadvantage of this mechanism lies in the fact that the jaws may be actuated only at a specific point along the stroke of the mounting head.

As an improvement over the spring loaded mechanism described in the above mentioned patent, others have resorted to the use of a fluid operated motor for actuating the jaws. The motor is in a form of conventional piston and cylinder mounted exteriorly of the mounting head, adjacent to the jaws. A relatively complex linkage assembly couples the output shaft of the motor with the input of the jaw mechanism, the input to the jaw mechanism and the output shaft of the motor being laterally offset with respect to each other. This prior art motor mounting arrangement demands that a relatively large motor be employed because of the need for a relatively long piston stroke and a large force for operating the linkage.

The actuating unit described above is not only undesirable from the standpoint of the complexity and cost of the motor and linkage but also because of the substantial weight it imposes on the mounting head which is supported in cantilever fashion from a base or support. The greater amount of cantilevered weight requires that heavier (and therefore more costly) support components and guides be employed.

Consequently, it is a primary object of the invention to provide robotic gripping apparatus employing an actuating unit which overcomes each of the difficiencies discussed above. This object, as well as further features and advantages of the present invention, will be made clear or will become apparent during the course of the following description.

Disclosure of the Invention

According to the present invention, apparatus for gripping and manipulating a workpiece includes a pair of actuatable gripping jaws secured on a mounting head for gripping and translating the workpiece. The mounting head is reciprocably mounted on a support by means of a pair of guides. One of the guides is defined by a fluid operated piston and cylinder combination for extending and retracting the mounting head. A rigid conduit adapted to be coupled with a source of fluid for supplying fluid to the motor is slidably mounted on the support and defines the other guide. The mounting head is of substantially unitary construction and includes a fluid operated motor internal thereof for operating the gripping jaws. The motor includes a piston and cylinder combination and an output shaft directly coupled with the mechanism controlling the gripping jaws.

BRIEF DESCRIPTION OF THE DRAWINGS

In the drawings, which form an integral part of the specification and are to be read in conjunction therewith, and in which like components are designated by identical reference numerals in the various views.

BEST MODE FOR CARRYING OUT THE INVENTION

Figure 1:
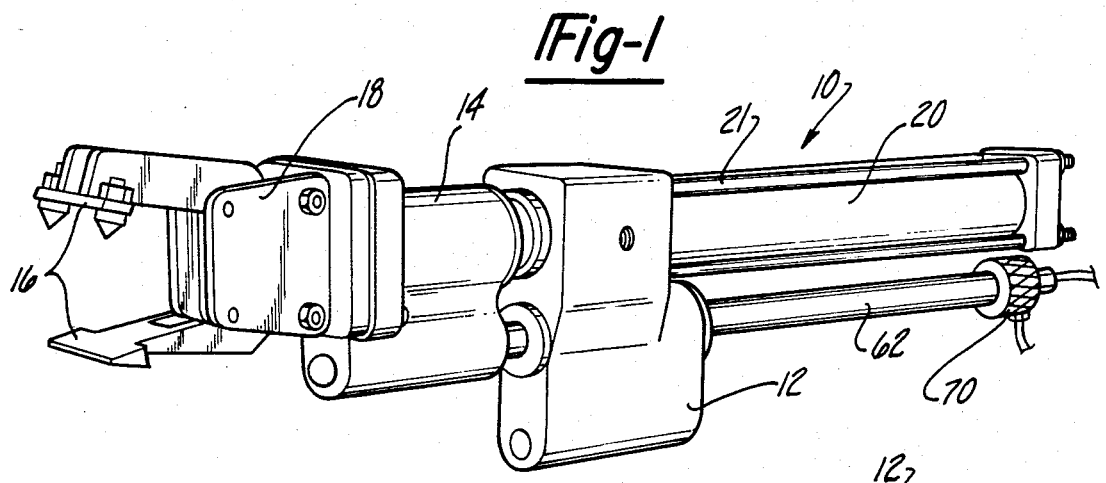
FIG. 1 is a perspective view of the apparatus including an actuating unit which forms the preferred embodiment of the present invention.

Referring to the drawings, the present invention is broadly concerned with apparatus for manipulating a workpiece including an actuating unit generally indicated by the numeral 10 in FIG. 1. Actuating unit 10 includes a support member 12 provided with a through hole 24 near the bottton thereof for mounting the support 12 on a suitable base. A conventional fluid operated piston and cylinder combination 20 is mounted on the rear of support 12 by means of rods 21. The piston and cylinder 20 include a longitudinally reciprocable drive shaft 22 which extends forwardly through an upper aperture in support 12. The outer end of drive shaft 22 is secured to mounting head 14 by means of a cover plate 30 and screw 32. Mounting head 14 is driven by the piston/cylinder combination 20 for reciprocation along an axis parallel to that of shaft 22. A later discussed conduit 62 is mounted for siding movement parallel to that of shaft 22 by means of bearings 68 within support 12, immediately beneath shaft 22. The forward extremity of conduit 62 is secured within a longitudinally extending bore in mounting head 14. It may thus be appreciated that conduit 62 guides the reciprocation of mounting head 14 and prevents rotation of the latter about the longitudinal axis of drive shaft 22.

A pair of opposed gripping jaws 16 are mounted by means of spaced flange plates 18 to the forward face of mounting head 14. Jaws 16 are coupled with a toggle mechanism which includes an input coupling 48 similar to that described in U.S. Pat. No. 4,252,361, the entire disclosure of which is hereby incorporated by reference herein. Toggling of the input coupling 48 fore and aft respectively closes and opens jaws 16.

A fluid operated mptor disposed wholly within upper portions of mounting head 14 comprises a piston 38 reciprocably disposed within a cylinder chamber 26 defined by a longitudinal bore within mounting head 14. The rear extremity of chamber 26 is closed by a cap 34 having an annular groove 36 therein which communicates with a fluid passageway 58. A radial bore 37 extends into a depression 39 in cap 36 so as to allow fluid to flow between passageway 58 and that part of chamber 26 at the rear of piston 38.

Piston 38 includes a pair of circumferentially extending seals 40 which bear against a wear liner 54. The forward end of chamber 26 is defined by a plug 44 having a circumferential groove 46 which communicates with a fluid passageway 56 as well as the forward side of chamber 26 via a radial bore 27 in plug 44.

A longitudinally extending output shaft 42 is secured to the forward face of piston 38 and extends through a central aperture in plug 44. Plug 44 includes a neck portion having a circumferential, fluid tight seal 52 which bears against the walls of shaft 42. The forward end of shaft 42 is provided with a groove therein which is conjugally connected with input coupling 48, thus providing a direct coupling between piston 38 and the toggle assembly which operates jaws 16.

Conduit 62 is cylindrically shaped and includes an inner delivery tube 64 of substantially less diameter than conduit 62. Conduit 62 and tube 64 form an inner fluid delivery line 63 and an outer, circumferentially extending delivery line 66. Delivery line 66 is coupled with passageway 58 while delivery line 63 is coupled with passageway 56.

The rear end of conduit 62 is provided with a fluid coupling manifold 70 secured by threads 71 to the conduit 62. Manifold 70 includes a pair of threaded input ports 72 and 74 which respectively communicate with delivery lines 66 and 63. Input ports 72 and 74 may be coupled with any suitable source of pressurized fluid.

Mounting head 14 includes a solid body of unitary construction, manufactured as by casting. Clean out plugs, such as that shown at 60 may be provided to gain access to the various fluid passageways formed in mounting head 14. In use, the piston/cylinder combination 20 reciprocates the mounting head 14 and jaws 16 along the stroke of drive shaft 22. The outer surfaces of conduit 62 are supported by bearking 68 and assist in guiding the movement of mounting head 14.

Figure 2:
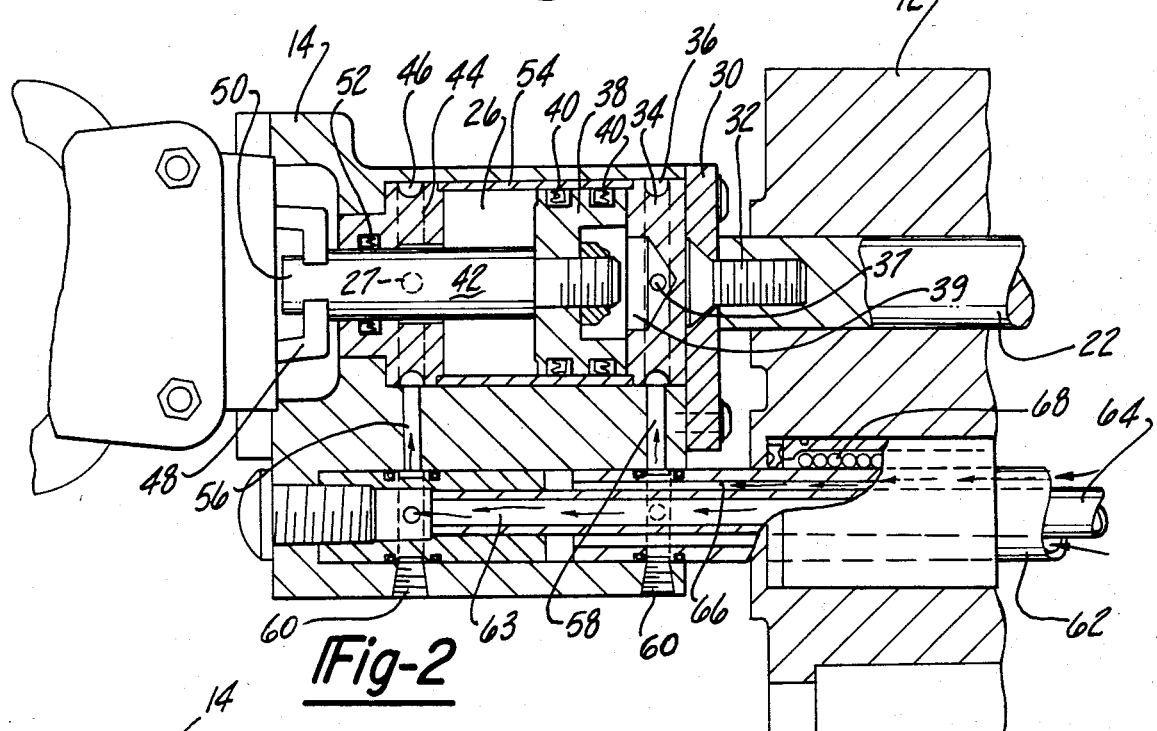
FIG. 2 is a fragmentary, longitudinal section view of the mounting head and a portion of the support, the piston of the jaw motor being shown in a retracted position corresponding to a state in which the jaws are open.
Figure 3:
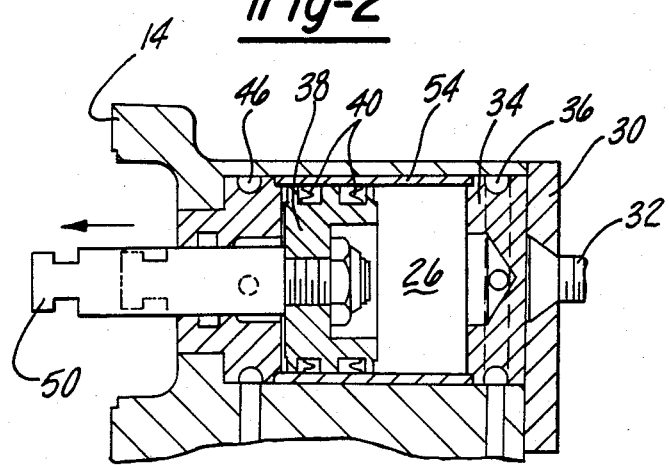
FIG. 3 is a fragmentary, longitudinal section view of the jaw motor, showing the piston thereof in an extended position corresponding to a state in which the jaws are closed.
Figure 4:
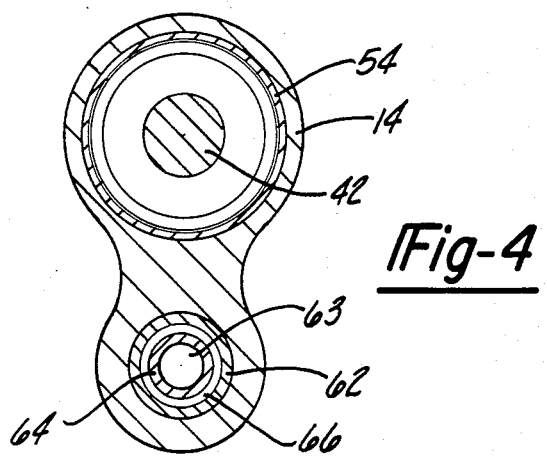
FIG. 4 is a cross sectional view taken along the line 4—4 in FIG. 2.
Figure 5:
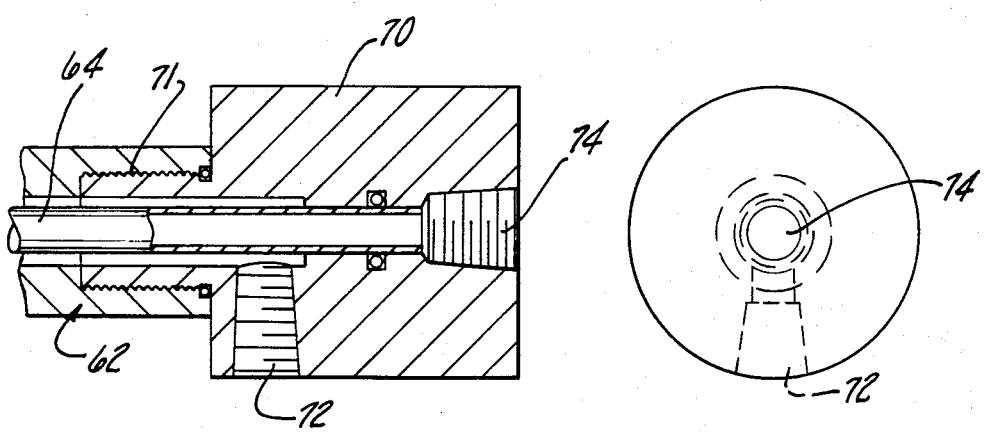
FIG. 5 is a fragmentary, longitudinal section view of the rear end of the conduit, showing the fluid coupling for the conduit; and, FIG. 6 is an end view of the coupling shown in FIG. 5.
Figure 6:
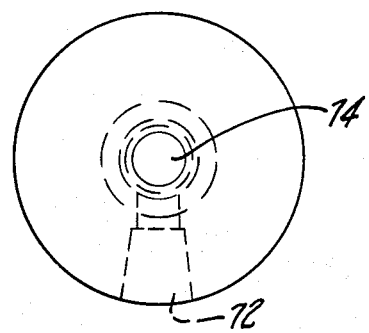

Fluid delivered through port 74 into line 63 is routed through passageway 56, groove 46 and bore 27 into the forward end of chamber 26. Pressurized fluid in the forward portion of chamber 26 forces the piston 38 rearwardly thus causing output shaft 42 to retract and open the jaws as shown in FIGS. 1 and 2. Jaws 16 may be closed at any point during the stroke by relieving the pressure in line 63 and delivering pressurized fluid through port 72 and line 66. Fluid in line 66 is routed through passageway 58, groove 36 and bore 37 into the aft end of chamber 26. Pressurized fluid in the aft end of chamber 26 forces the piston 38, and thus shaft 42 forwardly, thereby toggling the jaws 16 to a closed position.

By virtue of the direct coupling between piston 38 and input coupling 48 associated with jaws 16, a relatively short stroke of piston 38 is required to open and close jaws 16. Moreover, the virtue of the fact that the fluid motor controlling jaws 16 is defined wholly within mounting head 14, the weight on the free end of the assembly adjacent jaws 16 is substantially reduced.

In view of the foregoing, it is apparent that the apparatus described above and associated actuating unit not only provide for the reliable accomplishment of the objects of the invention but do so in a particularly effective and economical manner. It is recognized, of course, that those skilled in the art may make various modifications or additions to the preferred embodiment choosen to illustrate the invention without departing from the spirit and scope of the present contributions of the art. Accordingly, it is to be understood that the protection sought and to be afforded hereby should be deemed to extend to the subject matter claimed and all equivalents thereof fairly within the scope of the invention.

We claim:

1. Apparatus for manipulating a workpiece, comprising:
    a support;
    actuatable means for selectively engaging said workpiece and having a reciprocable input for actuating and deactuating said engaging means;
    means for mounting said engaging means for reciprocable movement on said support, said mounting means including
    (1) a mounting head for unitary, substantially solid construction,
    (2) means for mounting said engaging means on said mounting head,
    (3) means connected between said support and said mounting head for driving said mounting head to reciprocate and for slideably supporting said mounting head in spaced relationship to said support, and
    (4) means including an elongate rod connected between said support and said mounting head for preventing rotation of said head about the axis along which said head reciprocates; and
    means for actuating and deactuating said actuatable means, said actuating and deactuating means and including
    (1) a first bore in said mounting head and defining a fluid chamber,
    (2) a piston slideably disposed within said fluid chamber,
    (3) means for drivingly connecting said piston with said reciprocable input,
    (4) a pair of coaxial, cylindrical fluid conduits within said rod for delivering fluid to and from said head for respectively actuating and deactuating the actuating means, and
    (5) means within said head for placing said fluid delivering means in fluid communication with said fluid chamber.

* * * * *